(12) United States Patent
Forte

(10) Patent No.: US 9,363,663 B2
(45) Date of Patent: *Jun. 7, 2016

(54) METHOD AND APPARATUS FOR PROVIDING CELLPHONE SERVICE FROM ANY DEVICE

(71) Applicant: AT&T Intellectual Property I, L.P., Atlanta, GA (US)

(72) Inventor: Andrea G. Forte, Brooklyn, NY (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 14/577,474

(22) Filed: Dec. 19, 2014

(65) Prior Publication Data
US 2015/0105052 A1    Apr. 16, 2015

Related U.S. Application Data

(63) Continuation of application No. 13/251,965, filed on Oct. 3, 2011, now Pat. No. 8,942,673.

(51) Int. Cl.
| | |
|---|---|
| *H04M 1/66* | (2006.01) |
| *H04W 8/20* | (2009.01) |
| *H04W 12/06* | (2009.01) |
| *H04L 29/06* | (2006.01) |
| *H04W 4/24* | (2009.01) |
| *H04W 8/18* | (2009.01) |
| *H04M 3/42* | (2006.01) |

(52) U.S. Cl.
CPC .............. *H04W 8/20* (2013.01); *H04L 63/083* (2013.01); *H04W 12/06* (2013.01); *H04M 3/42229* (2013.01); *H04W 4/24* (2013.01); *H04W 8/18* (2013.01); *H04W 8/183* (2013.01)

(58) Field of Classification Search
CPC ........... H04W 4/24; H04W 8/18; H04W 8/20; H04W 8/183; H04M 3/42229
USPC .................................... 455/411, 414.1, 435.1
See application file for complete search history.

(56) References Cited

U.S. PATENT DOCUMENTS

| | | | |
|---|---|---|---|
| 2005/0227729 A1 | 10/2005 | Nakayama | |
| 2006/0094398 A1 | 5/2006 | Chaar et al. | |
| 2007/0111726 A1* | 5/2007 | Lambert et al. | 455/432.1 |
| 2007/0298776 A1 | 12/2007 | Arlene | |
| 2010/0311402 A1* | 12/2010 | Srinivasan et al. | 455/418 |
| 2011/0151835 A1* | 6/2011 | Velusamy | 455/411 |
| 2012/0040654 A1* | 2/2012 | Martin et al. | 455/418 |
| 2012/0108204 A1* | 5/2012 | Schell et al. | 455/411 |

\* cited by examiner

*Primary Examiner* — Charles Appiah
*Assistant Examiner* — Jaime Holliday

(57) ABSTRACT

A method, non-transitory computer readable medium and apparatus for providing a cellular communication service for any device via a communications network are disclosed. For example, the method receives a log-in request of a user from a device, if the log-in request is authenticated, synchronizes the device with a configuration associated with the user and provides the cellular communication service via a subscription plan subscribed to by the user.

18 Claims, 3 Drawing Sheets

METHOD AND APPARATUS FOR PROVIDING CELLPHONE SERVICE FROM ANY DEVICE

This application is a continuation of U.S. patent application Ser. No. 13/251,965, filed Oct. 3, 2011, which is currently allowed and is herein incorporated by reference in its entirety.

The present disclosure relates generally to cellular communications and, more particularly, to a method and apparatus for providing cellular telephone service from any device.

BACKGROUND

Currently, when a device authenticates itself to a network, the device is authenticating a subscriber identity module to the network. The subscriber identity module also identifies the user. As a result, by authenticating the subscriber identity module in the device, the user is authenticated as well.

However, by using this method of authentication, the authentication of the device and the user are tied together. As a result, the user is tied to a particular device. In addition, other users cannot use the particular device without incurring a charge to the owner of the particular device because the particular device is associated with the owner via the subscriber identification module.

SUMMARY

In one embodiment, the present disclosure provides a method, non-transitory computer readable medium and apparatus for providing a cellular communication service for any device via a communications network. For example, the method receives a log-in request of a user from a device, if the log-in request is authenticated, synchronizes the device with a configuration associated with the user and provides the cellular communication service via a subscription plan subscribed to by the user.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method, non-transitory computer readable medium and apparatus for providing a cellular communication service from any device via a communications network. For example, communication services may be provided from a network cloud such that the device allows any user to use the device and have the user's subscription plan follow the user to any device.

Currently, when a device authenticates itself to a network, the device is authenticating a subscriber identity module to the network. For example, in a cellular telephone, the subscriber identity module also identifies the user. As a result, by authenticating the subscriber identity module in the device, the user is authenticated as well.

However, by using this method of authentication, the authentication of the device and the user are tied together. As a result, the user is tied to a particular device. However, by moving the cellular communication services to the network cloud, the device no longer needs to be tied to the user and any user may access their subscription plan on any device at any time.

Figure 1:
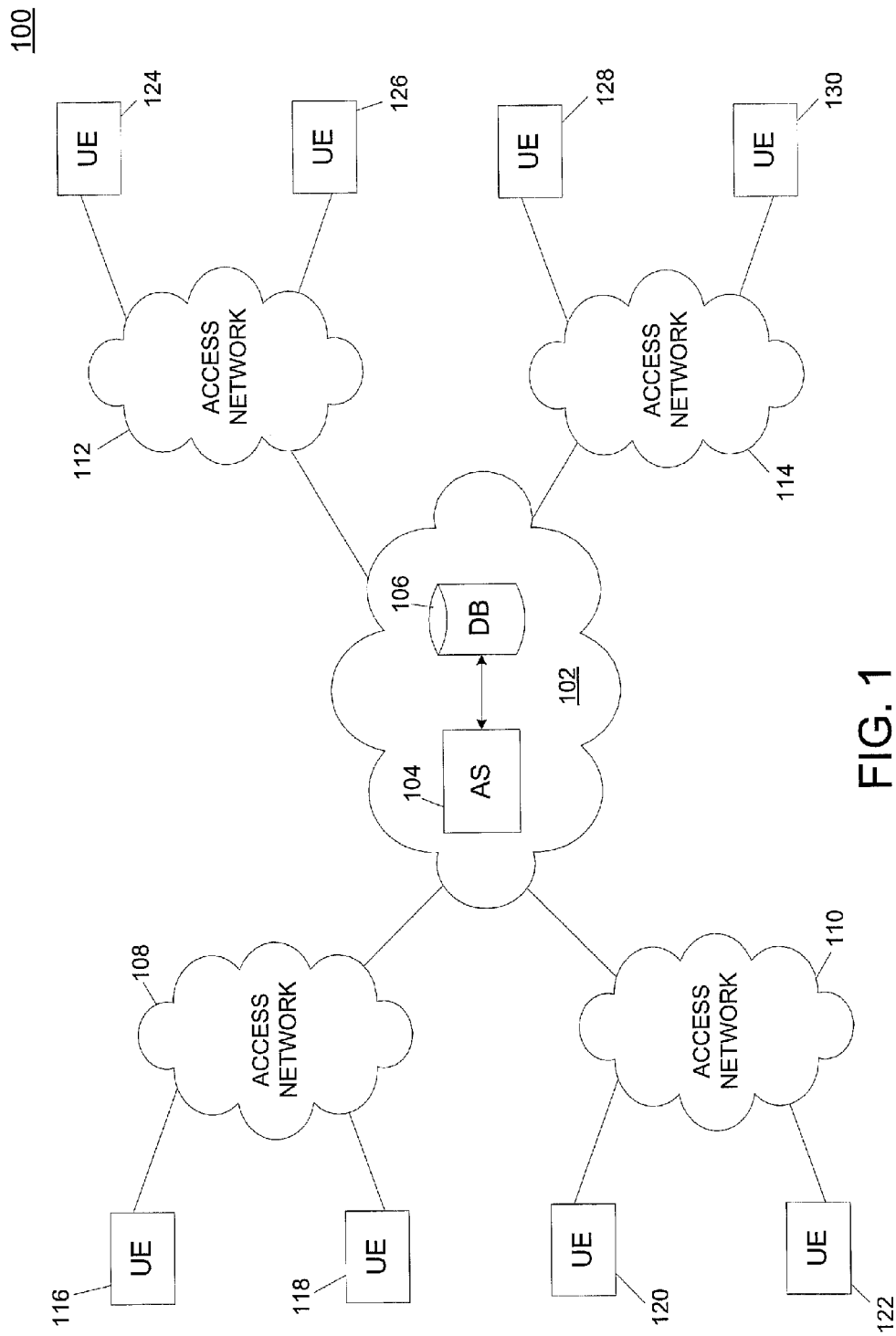
FIG. 1 illustrates one example of a communications network of the present disclosure.

FIG. 1 is a block diagram depicting one example of a communications network 100. The communications network 100 may be any type internet protocol (IP) network such as an Internet Protocol (IP) Multimedia Subsystem (IMS) network, an asynchronous transfer mode (ATM) network, a wireless network, a cellular network, a long term evolution (LTE) network, and the like, related to the current disclosure. It should be noted that an IP network is broadly defined as a network that uses Internet Protocol to exchange data packets. Additional exemplary Internet protocol (IP) networks include Voice over Internet Protocol (VoIP) networks, Service over Internet Protocol (SoIP) networks, and the like. The present disclosure is not limited to any particular network architecture.

In one embodiment, the network 100 may comprise a core network 102. The core network 102 may be in communication with one or more access networks 108, 110, 112 and 114. The access networks 108, 110, 112 and 114 may include a wireless access network, a cellular access network, a publicly switched telephone network (PSTN) access network, a cable access network, a wired access network and the like. In one embodiment, the access networks 108, 110, 112 and 114 may all be different types of access networks, may all be the same type of access network or some access networks may be the same type of access network and other may be different types of access networks. The core network 102 and the access networks 108, 110, 112 and 114 may be operated by different service providers, the same service provider or a combination thereof.

In one embodiment, the access networks 108, 110, 112 and 114 may be in communication with one or more user endpoints (also referred to as "endpoints" or "UEs") 116, 118, 120, 122, 124, 126, 128 and 130, respectively. The endpoints 116, 118, 120, 122, 124, 126, 128 and 130 may be any type of endpoint device including, for example, a smart phone, a cellular telephone, a laptop, a tablet device, a desktop computer, a 3G universal serial bus (USB) dongle for wireless data communication and the like.

In one embodiment, the core network 102 may include an application server (AS) 104 and a database (DB) 106. Although only a single application server 104 and a single database 106 are shown in FIG. 1, it should noted that any number of application servers 104 and databases 106 may be deployed. In addition, although FIG. 1 illustrates the application server 104 and the database 106 being deployed in the core network 102, it should be noted that the application server 104 and the database 106 may be deployed in one of the access networks 108, 110, 112 or 114 or at a third party site.

In one embodiment, the database 106 may store various information about a subscriber associated with an endpoint device 116, 118, 120, 122, 124, 126, 128 or 130, a subscription plan associated with the subscriber and configuration information associated with the subscriber. In one embodiment, the subscription plan may include one or more of a data plan, a voice plan or a messaging plan. For example, the information about the subscriber may include the subscriber's name, address, billing information, log-in username and password, and the like. In one embodiment, the subscription plan may include information, such as for example, an amount of data usage allotted to the subscriber for a particular plan, e.g., data, voice or messaging, cost of the subscription plan, cost of one or more service features, one or more service parameters associated with the subscription plan, a service provider associated with the subscription plan, and the like. In one embodiment, the one or more service parameters may be include, for example, the type of access network that should be used to deliver the data or communication services to the user, quality of service (QoS) requirements, latency requirements, speed requirements, security requirements and the like.

In one embodiment, the configuration information may include a contact list, a calendar, application files, note files, program files, an arrangement of icons on a graphical user interface and the like. For example, all or some of the configuration information may be downloaded onto an endpoint device when the subscriber logs into an endpoint device.

In one embodiment, the application server 104 may communicate with the one or more endpoint devices 116, 118, 120, 122, 124, 126, 128 or 130 and the database 106 to provide cellular communication services from "the network cloud". In other words, using the communications network as described herein, a subscriber to a communication service (e.g., a cellular service) is not tied to any particular user endpoint device. Rather, the subscriber may have a subscription plan that is associated with the subscriber and the subscriber may access the subscription plan irrespective of the endpoint device that is used by the subscriber.

For example, a first subscriber may own endpoint device 116 associated with a service provider of the access network 108. The subscriber may be traveling and leave their endpoint device 116 at home. As a result, the subscriber may need to use a second subscriber's endpoint device 120 associated with a different service provider of the access network 110.

Previously, the first subscriber could borrow the different subscriber's endpoint device 120, but the second subscriber would be charged for any data usage or communication services used by the first subscriber. However, using the communication services from "the network cloud", the first user may access their own subscription plan by logging into the endpoint device 120 of the second subscriber. As a result, the first user may use the endpoint device 120 of the second subscriber and the cost associated with the data usage and communication services may be attributed to the first subscriber's subscription plan instead of the second subscriber's subscription plan.

In addition, the first subscriber may have some of their configuration information, such as for example, their contacts and calendar information downloaded onto the second subscriber's endpoint device 120 temporarily while they are logged into the endpoint device 120. Once they are finished and log out of the endpoint device 120, the first subscriber may have their configuration information deleted from the endpoint device 120. As a result, the endpoint device 120 may be returned to the second subscriber in the original state.

Moreover, the first subscriber may access the communication services in accordance with one or more service parameters associated with the first subscriber's subscription plan even though the subscriber is using the second subscriber's endpoint device 120. For example, the first subscriber's subscription plan may require voice communications to be provided in accordance with one or more performance parameters, e.g., a highest level of quality of service (QoS) with full encryption over the first subscriber's carrier network. In another example, the first subscriber's subscription plan may require that data be provided at the highest download and upload speeds over a high speed data network. As a result, when the first subscriber logs into the endpoint device 120, the first subscriber may access his or her communication services in accordance with the one or more service or performance parameters associated with the first subscriber's subscription plan and not the second subscriber's subscription plan, even though the endpoint device 120 is activated and owned by the second subscriber and even though the second subscriber is associated with a completely different carrier network.

In addition, one or more non-performance parameters associated with the first subscriber's subscription plan may be used to access the communication services. Non-performance parameters may include, for example, a telephone number associated with the first subscriber's subscription plan. For example, incoming calls to the first subscriber's subscription plan may be temporarily routed to the second subscriber's endpoint device while the first subscriber is logged into the second subscriber's endpoint device.

It should be noted that the network 100 has been simplified. For example, the network 100 may include other network elements (not shown) such as border elements, routers, switches, call control elements, policy servers, security devices, a content distribution network (CDN) and the like.

Figure 2:
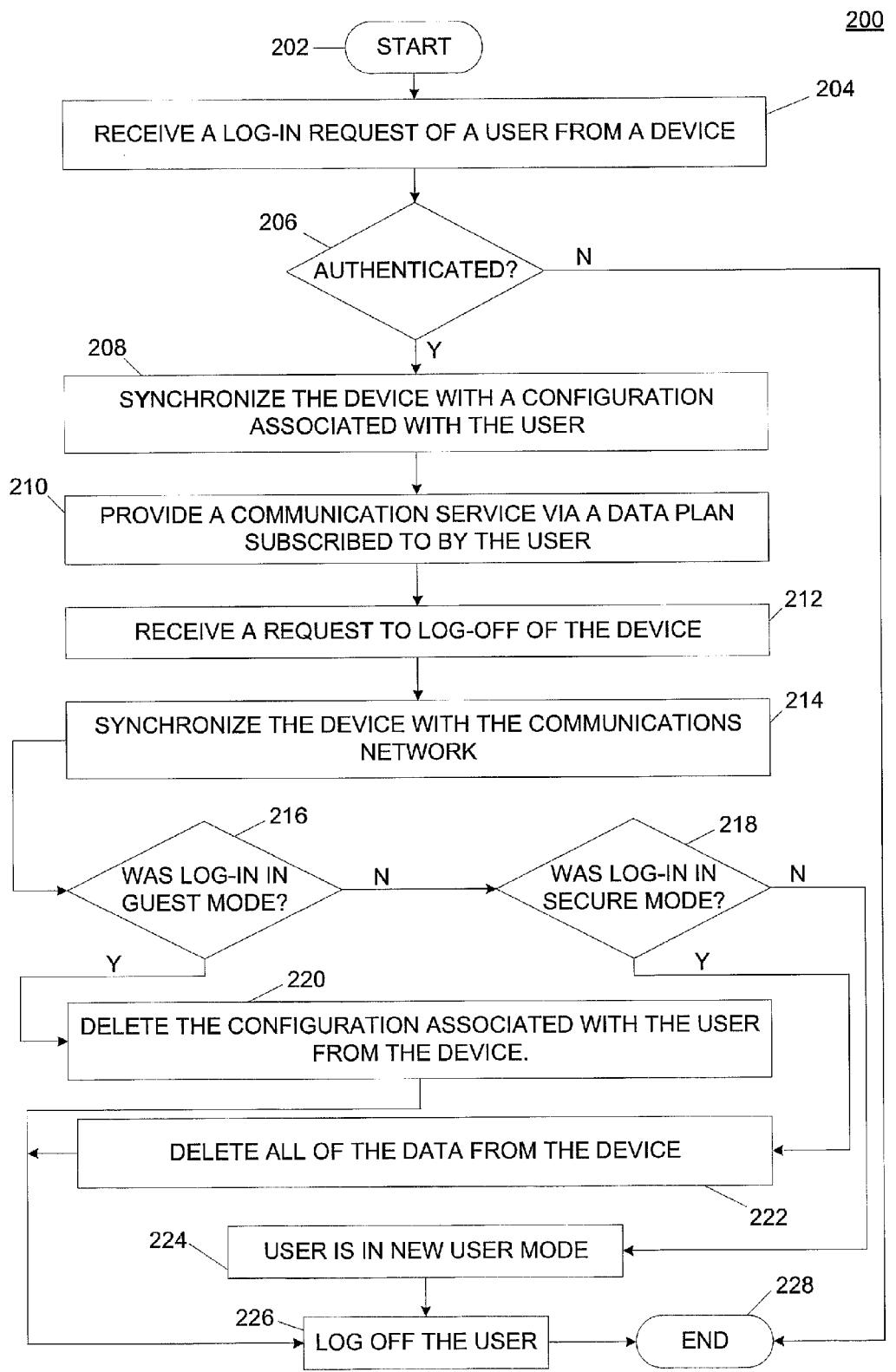
FIG. 2 illustrates an example flowchart of one embodiment of a method for providing a cellular communication service from any device via a communications network.
Figure 3:
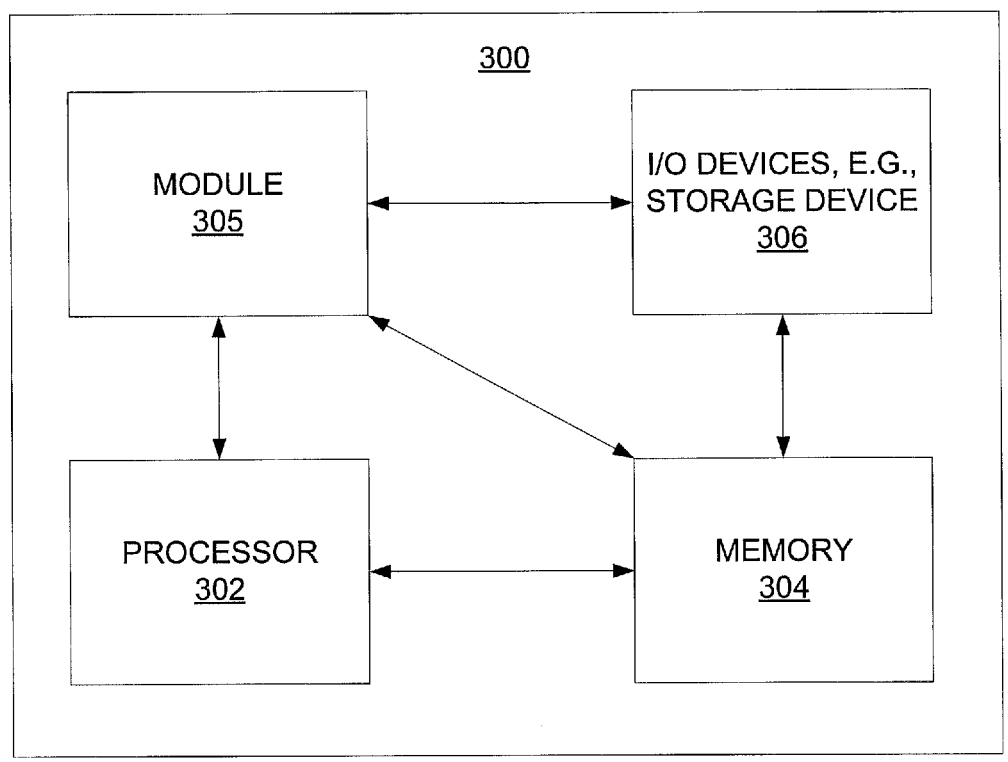
FIG. 3 illustrates a high-level block diagram of a general-purpose computer suitable for use in performing the functions described herein.

FIG. 2 illustrates a flowchart of a method 200 for providing a cellular communication service from any device via a communications network. In one embodiment, the method 200 may be performed by the application server 104 or a general purpose computer as illustrated in FIG. 3 and discussed below.

The method 200 beings at step 202. At step 204, the method 200 receives a log-in request of a user from a device. For example, the log-in request may be on any device even if the device is not the user's registered device. In other words, the user may log-in on a device that was activated and is owned by a different user.

In one embodiment, different types of log-in modes may be used. For example, the log-in modes may include a guest mode, a secure mode and a new owner mode. It should be noted that although three log-in modes are described, other types of log-in modes may be used and the flow chart may be easily adapted to include additional types of log-in modes. The illustrative log-in modes disclosed and described below are not intended to be limiting.

In one embodiment, the guest mode may be a log-in mode when the user is accessing a communication service on another user's device. In one embodiment, certain configuration files may be downloaded to the device, e.g., only the user's contacts, calendar, one or more service parameters, which carrier network should be accessed for voice and data services, and the like, and the user may only have limited access to various applications on the device.

In one embodiment, the secure mode may be a log-in mode when the user is on the user's own device but has the all of the data on the device erased after the user log off of the device. This ensures that if the device is lost or stolen, the perpetrator would have no access to any files on the device.

In one embodiment, the new owner mode may be a log-in mode when the user initially activates the device. For example, the user has bought a new cellular telephone and the cellular telephone is being activated for the first time.

It should be noted that the user may switch between modes on subsequent log-in attempts. For example, at a first time the user may log-in under the new owner mode. At a later subsequent time, the user may log-in under the secure mode.

At step 206, the method 200 determines if the user is authenticated. For example, the user may be prompted to enter a username and a password on the device, e.g., via a graphical user interface or via an automated interactive voice recognition (IVR) system. In another embodiment, a quick response (QR) code may be used in conjunction with the username and password.

In one embodiment, the user may have subscribed to a cell phone in "the network cloud" service at an earlier time. During the initial registration for the subscription, the user may have selected a username and a password that may be stored in the network in the database 106. Thus, in one embodiment, authentication may comprise determining if the username and the password entered by the user during the log-in process match a username and password stored in the network.

If the user authentication fails, the method 200 proceeds to step 228 where the method 200 ends. If the user authentication is successful, the method 200 proceeds to step 208.

At step 208, the method 200 synchronizes or associates the device with a configuration associated with the user. Once the user is authenticated, the network may download one or more configuration files to the device depending on the mode the user has logged-in under. For example, if the user is logged-in under a guest mode, only some of the configuration files may be downloaded during synchronization, e.g., a contact list, a calendar, an email application and the like. However, if the user is logged-in under a new owner mode, all of the configuration files may be downloaded to the device including how icons should be arranged on the user interface.

During the synchronizing step 208, the configuration files may also include information about how data and communication service should be provided. For example, the device may be configured to communicate with the user's carrier network and provide services in accordance with one or more service parameters associated with the user's subscription plan.

At step 210, the method 200 provides a cellular communication service via a subscription plan subscribed to by the user. In other words, use of the device is deducted from (or charged to) the subscription plan associated with the user, even if the device was not activated by the user and is owned by a different user having a different independent subscription plan. In addition, the communication service (e.g., cellular service) is provided in accordance with the service parameters associated with the subscription plan of the subscriber, even if the device has different service parameters associated with a different user that owns the device.

For example, a first user who owns the device may choose to pay less for a slower speed subscription plan and lower Quality of Service (QoS) voice communications. However, a second user may have paid for the fastest speed subscription plan and highest QoS for voice communications. As a result, if the second user logs into the device owned by the first user under a guest log-in mode, the second user may still receive data at the fastest speed and voice communications at the highest QoS. For example, the configuration files downloaded during the synchronization at step 208 may also include parameters that indicate to the device how a call should be connected or how data should be routed to and from the device (e.g., which service provider network, which access network, what priority data to and from the device should be assigned, and the like). Thus, in one embodiment, the first user and the second user may not even be subscribed to the same service provider or carrier network, yet both may use the same device and have their calls routed over different access networks operated by two different service providers using their log-in and configuration information associated with their respective subscription plans that is downloaded to the device.

As a result, a device is not tied to a single user. By moving the intelligence of the communication services to "the network cloud" any user may use any device. In other words, a subscription plan associated with a user moves with that user from device to device. For example, a first user may log into his or her cellular telephone and access communication services under the first user's subscription plan and any usage will be deducted from the first user's subscription plan. Immediately after the first user is done, a second user may log into the same cellular telephone under a guest mode and access communication services under the second user's subscription plan and any usage will be deducted from the second user's subscription plan even though he or she is using the first user's cellular telephone. Notably, no switching of hardware or reconfiguration of the device is necessary, e.g., swapping SIM cards.

At step 212, the method 200 receives a request to log-off of the device. For example, after the user has finished all of his or her communication services, the user will request to log-off of the device.

At step 214, the method synchronizes the device with the communications network. In one embodiment, the communications network may synchronize the device such that any changes may be uploaded and saved to the network, e.g., in the database 104. For example, the user may have added new contacts, received new emails or downloaded new applications while the user was logged into the device. As a result, to ensure these changes are not lost for a subsequent log-in by the user, the device synchronizes with the communications network.

In one embodiment, the synchronization may include all of the data on the phone. In one embodiment, the synchronization may include only the changes associated with the user that was logged-in (e.g., if a guest is logged-in under a guest mode, only changes to the data that was downloaded at step 208 may need to be re-synchronized with the communications network).

In one embodiment, the synchronization may be performed automatically upon receiving the request to log-off. In one embodiment, the device may prompt the user to manually initiate the synchronization.

At step 216, the method determines if the log-in was in a guest mode. As discussed above, the user may log-in under one of a variety of different modes. If the log-in was in the guest mode, the method proceeds to step 220.

At step 220, the method 200 deletes the configuration associated with the user from the device. In other words, only a limited number of data files were downloaded to the device or a limited number of configuration changes were made to the device at step 208 under a guest mode. As a result, only those limited number of configuration changes or data files need to be deleted. Said another way, all of the configuration information associated with the owner of the device is not deleted. As a result, the guest user may return the device to the user in the state that the guest user received the device. The method then proceeds to step 226 where the user is logged-off of the device. The method 200 ends at step 228.

Referring back to step 216, if the log-in was not in the guest mode, the method 200 proceeds to step 218. At step 218, the method 200 determines if the log-in was in a secure mode. As discussed above, in one embodiment, secure mode provides a way to ensure that no data is left on the device after the user is finished accessing his or her communication services via the device. As a result, all data on the device is deleted after the user requests to log-off of the device. This may prevent access to secure information if the device is stolen or lost. If the log-in was in the secure mode, the method proceeds to step 222.

At step 222, the method 200 deletes all of the data from the device. The method 200 then proceeds to step 226 where the user is logged-off of the device. The method 200 ends at step 228.

Referring back to step 218, if the log-in was not in the secure mode, the method proceeds to step 224. At step 224, the method 200 determines that the user was logged-in under the new user mode. For example, a user may have had an older device, which had all of the configuration information saved to the network. The user then purchases a new phone and activates the phone. Upon the initial activation, the user may log-in under a new user mode and all of the configuration information from the old device may be downloaded to the new device. Under the new user mode, no data needs to be deleted upon receiving the log-off request.

As a result, the method 200 proceeds to step 226 where the user is logged off of the device. The method 200 ends at step 228.

It should be noted that although not explicitly specified, one or more steps of the method 200 described above may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIG. 2 that recite a determining operation, or involve a decision, do not necessarily require that both branches of the determining operation be practiced. In other words, one of the branches of the determining operation can be deemed as an optional step.

FIG. 3 depicts a high-level block diagram of a general-purpose computer suitable for use in performing the functions described herein. As depicted in FIG. 3, the system 300 comprises a processor element 302 (e.g., a CPU), a memory 304, e.g., random access memory (RAM) and/or read only memory (ROM), a module 305 for providing a cellular communication service from any device via a communications network, and various input/output devices 306 (e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents. In one embodiment, the present module or process 305 for providing a cellular communication service from any device via a communications network can be loaded into memory 304 and executed by processor 302 to implement the functions as discussed above. As such, the present module or process 305 for providing a cellular communication service from any device via a communications network (including associated data structures) of the present disclosure can be stored on a non-transitory (physical or tangible) computer readable storage medium, e.g., RAM memory, magnetic or optical drive or diskette and the like.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for providing a cellular communication service via a communications network, the method comprising:
   receiving, by a processor, a log-in request of a guest user from a device, the log-in request comprising a username and a password entered into the device by the guest user, wherein the device is associated with a first subscription plan from a first cellular communication service provider of an owner user, wherein the owner user is the owner of the device;
   when the log-in request is authenticated, synchronizing, by the processor, the device with a configuration associated with the guest user; and
   providing, by the processor, the cellular communication service via a second subscription plan from a second cellular communication service provider subscribed to by the guest user, wherein the second subscription plan from the second cellular communication service provider subscribed to by the guest user is different from the first subscription plan from the first cellular communication service provider associated with the device, wherein the second subscription plan from the second cellular communication service provider subscribed to by the guest user is stored in an application server in the communications network to provide the cellular communication service in accordance with the second subscription plan to any device used by the guest user, wherein the second subscription plan comprises a plurality of performance parameters comprising: a quality of service associated with a voice communication of the cellular communication service, a speed associated with a data communication of the cellular communication service, and a type of access network to provide the cellular communication service.

2. The method of claim 1, wherein the device comprises a cellular telephone.

3. The method of claim 1, wherein the log-in request comprises a guest mode.

4. The method of claim 1, wherein the log-in request comprises a new-owner mode.

5. The method of claim 4, wherein the new-owner mode comprises:
   activating and authenticating, by the processor, the device with the communications network; and
   synchronizing, by the processor, the device with the communications network when the guest user requests to log-off of the device.

6. The method of claim 1, wherein the log-in request comprises a secure mode.

7. The method of claim 6, wherein the secure mode comprises:
   synchronizing, by the processor, the device with the communications network when the guest user requests to log-off of the device; and
   deleting, by the processor, all data of the guest user from the device before logging-off the guest user from the device.

8. A non-transitory computer-readable medium storing a plurality of instructions which, when executed by a processor, cause the processor to perform operations for providing a cellular communication service via a communications network, the operations comprising:
   receiving a log-in request of a guest user from a device, the log-in request comprising a username and a password entered into the device by the guest user, wherein the device is associated with a first subscription plan from a first cellular communication service provider of an owner user, wherein the owner user is the owner of the device;

when the log-in request is authenticated, synchronizing the device with a configuration associated with the guest user; and providing the cellular communication service via a second subscription plan from a second cellular communication service provider subscribed to by the guest user, wherein the second subscription plan from the second cellular communication service provider subscribed to by the guest user is different from the first subscription plan from the first cellular communication service provider associated with the device, wherein the second subscription plan from the second cellular communication service provider subscribed to by the guest user is stored in an application server in the communications network to provide the cellular communication service in accordance with the second subscription plan to any device used by the guest user, wherein the second subscription plan comprises a plurality of performance parameters: comprising a quality of service associated with a voice communication of the cellular communication service, a speed associated with a data communication of the cellular communication service, and a type of access network to provide the cellular communication service.

9. The non-transitory computer-readable medium of claim 8, wherein the device comprises a cellular telephone.

10. The non-transitory computer-readable medium of claim 8, wherein the log-in request comprises a guest mode.

11. The non-transitory computer-readable medium of claim 8, wherein the log-in request comprises a new-owner mode.

12. The non-transitory computer-readable medium of claim 11, wherein the new-owner mode comprises:
activating and authenticating the device with the communications network; and
synchronizing the device with the communications network when the guest user requests to log-off of the device.

13. The non-transitory computer-readable medium of claim 8, wherein the log-in request comprises a secure mode.

14. The non-transitory computer-readable medium of claim 13, wherein the secure mode comprises:
synchronizing the device with the communications network when the guest user requests to log-off of the device; and
deleting all data of the guest user from the device before logging-off the guest user from the device.

15. An apparatus for providing a cellular communication service, the apparatus comprising:
a processor; and
a computer-readable medium storing a plurality of instructions which, when executed by the processor, cause the processor to perform operations, the operations comprising:
receiving a log-in request of a guest user from a device, the log-in request comprising a username and a password entered into the device by the guest user, wherein the device is associated with a first subscription plan from a first cellular communication service provider of an owner user, wherein the owner user is the owner of the device;
when the log-in request is authenticated, synchronizing the device with a configuration associated with the guest user; and
providing the cellular communication service via a second subscription plan from a second cellular communication service provider subscribed to by the guest user, wherein the second subscription plan from the second cellular communication service provider subscribed to by the guest user is different from the first subscription plan from the first cellular communication service provider associated with the device, wherein the second subscription plan from the second cellular communication service provider subscribed to by the guest user is stored in an application server in a communications network to provide the cellular communication service in accordance with the second subscription plan to any device used by the guest user, wherein the second subscription plan comprises a plurality of performance parameters comprising: a quality of service associated with a voice communication of the cellular communication service, a speed associated with a data communication of the cellular communication service, and a type of access network to provide the cellular communication service.

16. The apparatus of claim 15, wherein the log-in request comprises a new-owner mode.

17. The apparatus of claim 16, wherein the new-owner mode comprises:
activating and authenticating, by the processor, the device with the communications network; and
synchronizing, by the processor, the device with the communications network when the guest user requests to log-off of the device.

18. The apparatus of claim 15, wherein the log-in request comprises a secure mode.

* * * * *